Sept. 22, 1959 B. A. WEINSTEIN 2,905,211
CONVERTIBLE MATERIAL WORKING MACHINE TOOL
OF THE TILTABLE FRAME TYPE
Filed Nov. 13, 1956 7 Sheets-Sheet 6
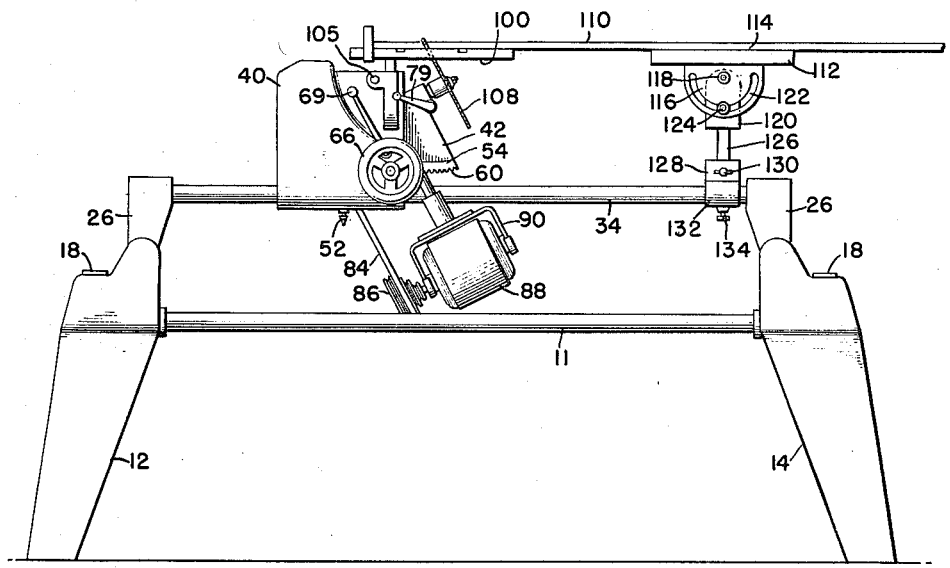
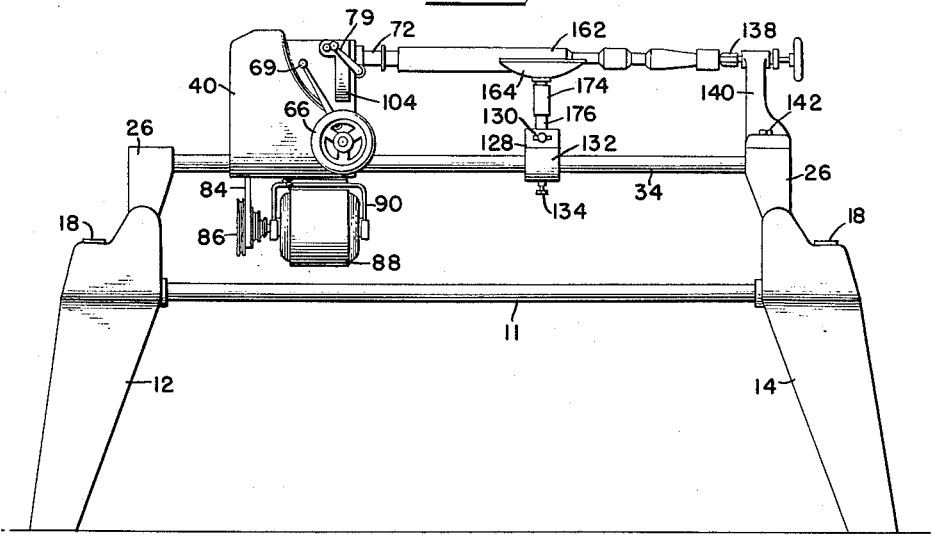
*INVENTOR*
BURTON A. WEINSTEIN
BY *Gustave Miller*
ATTORNEY

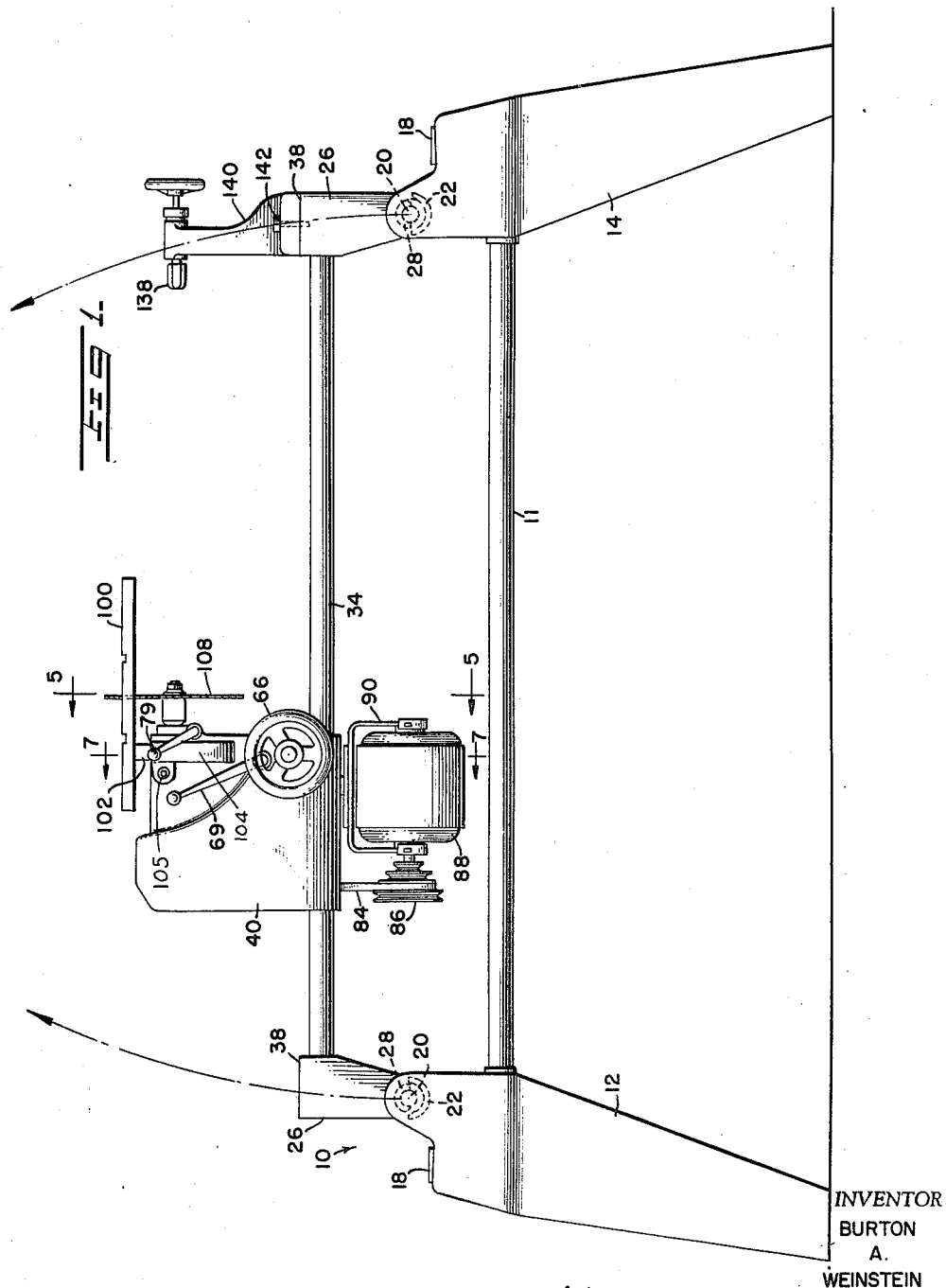

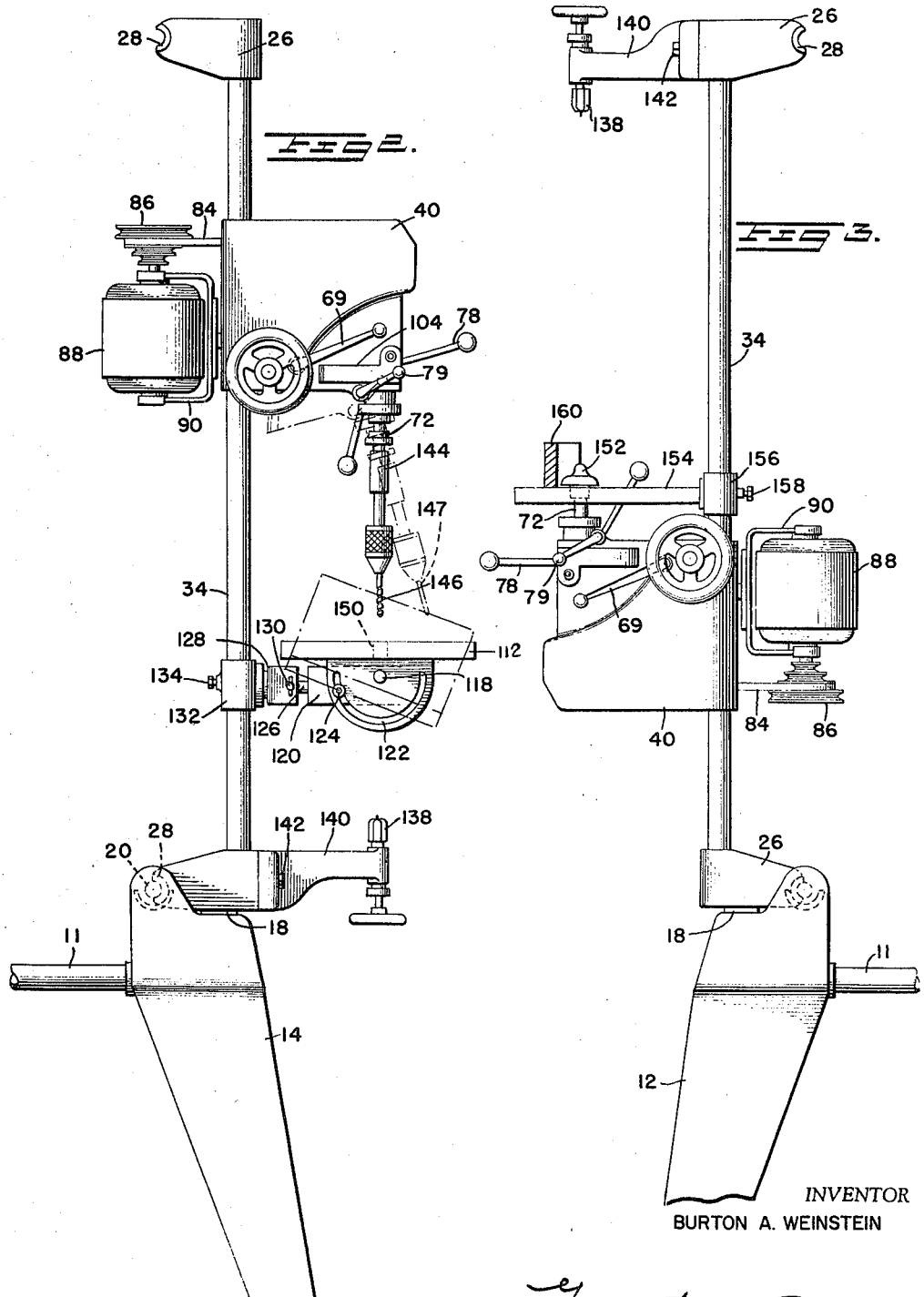

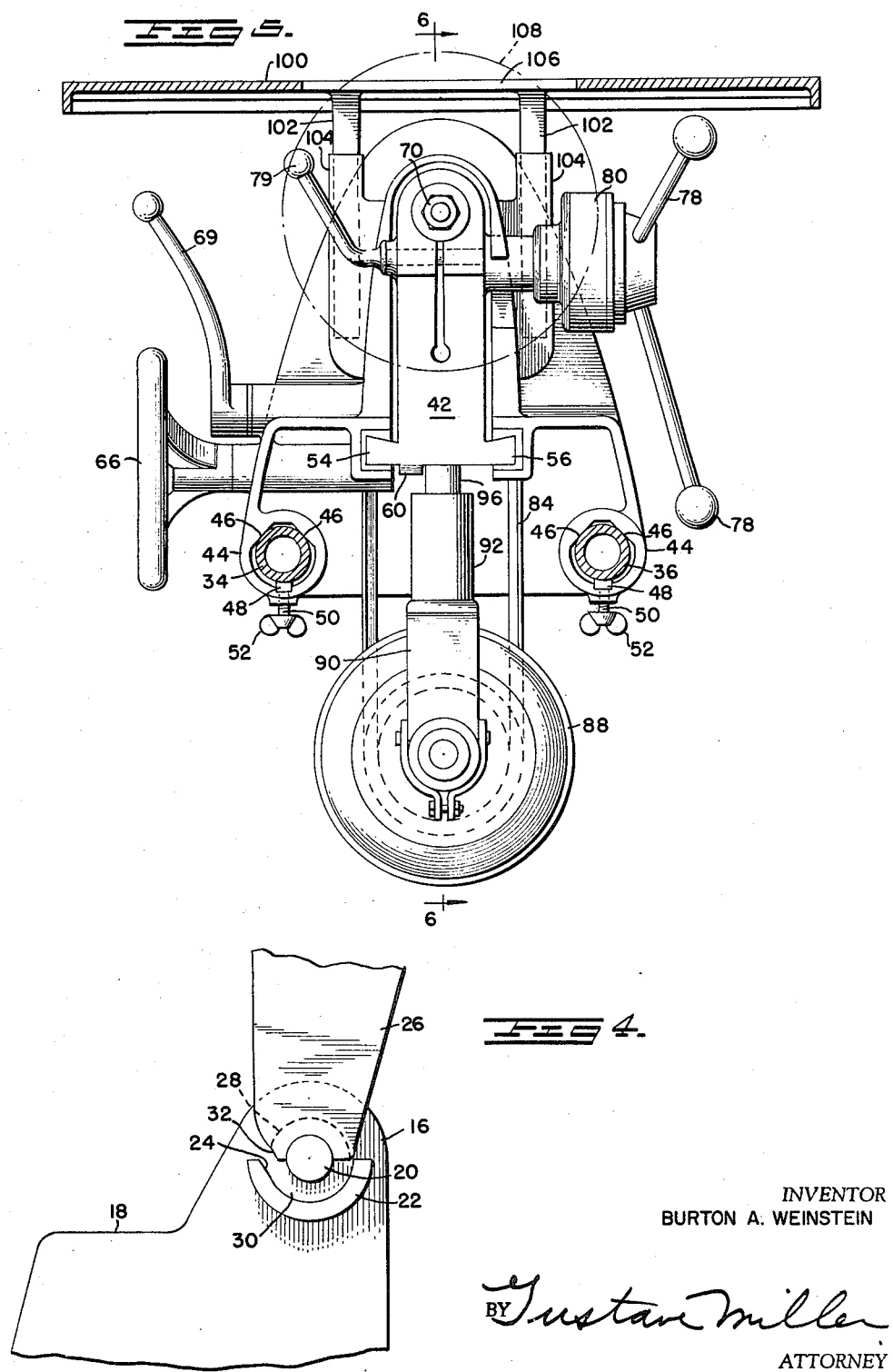

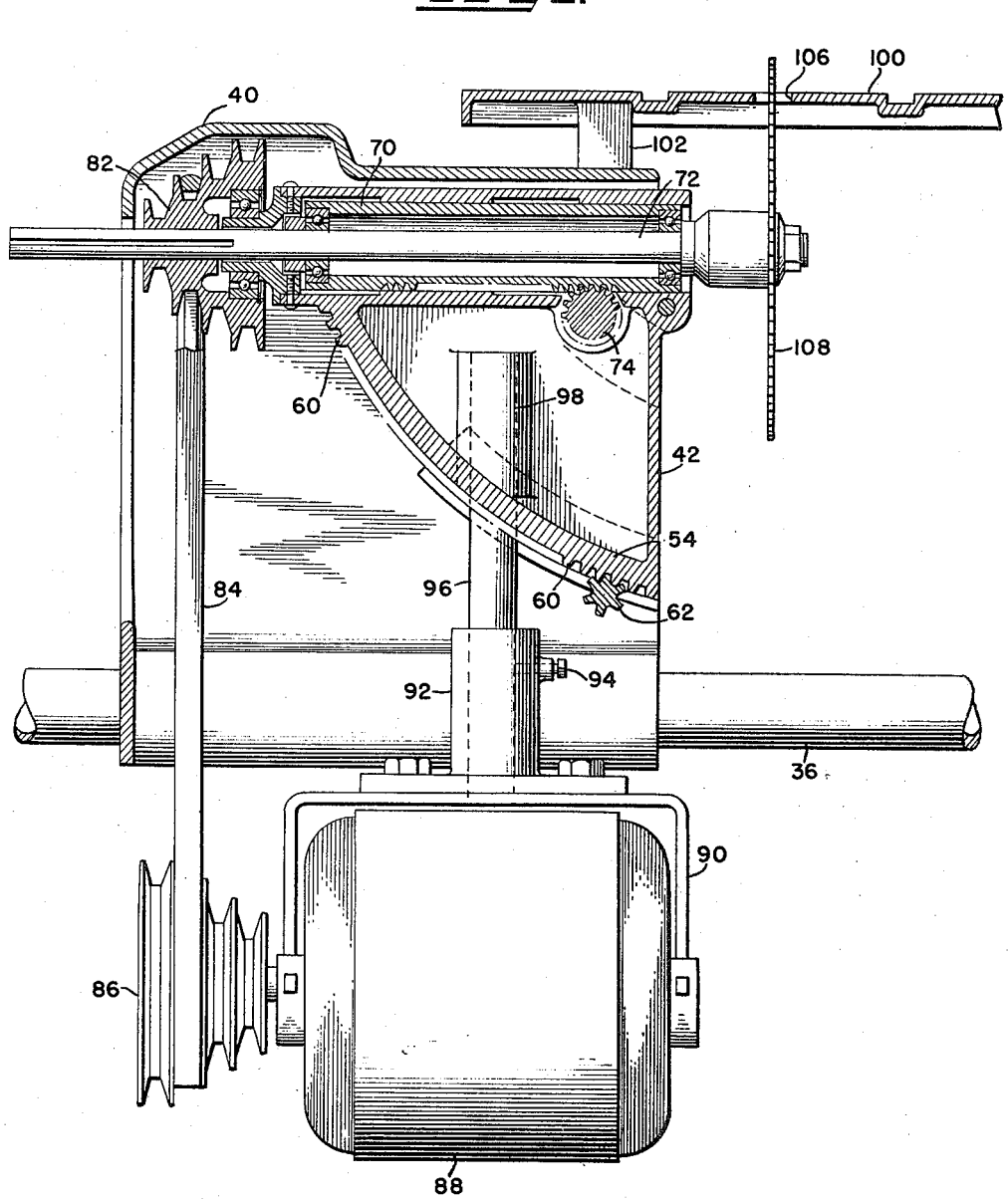

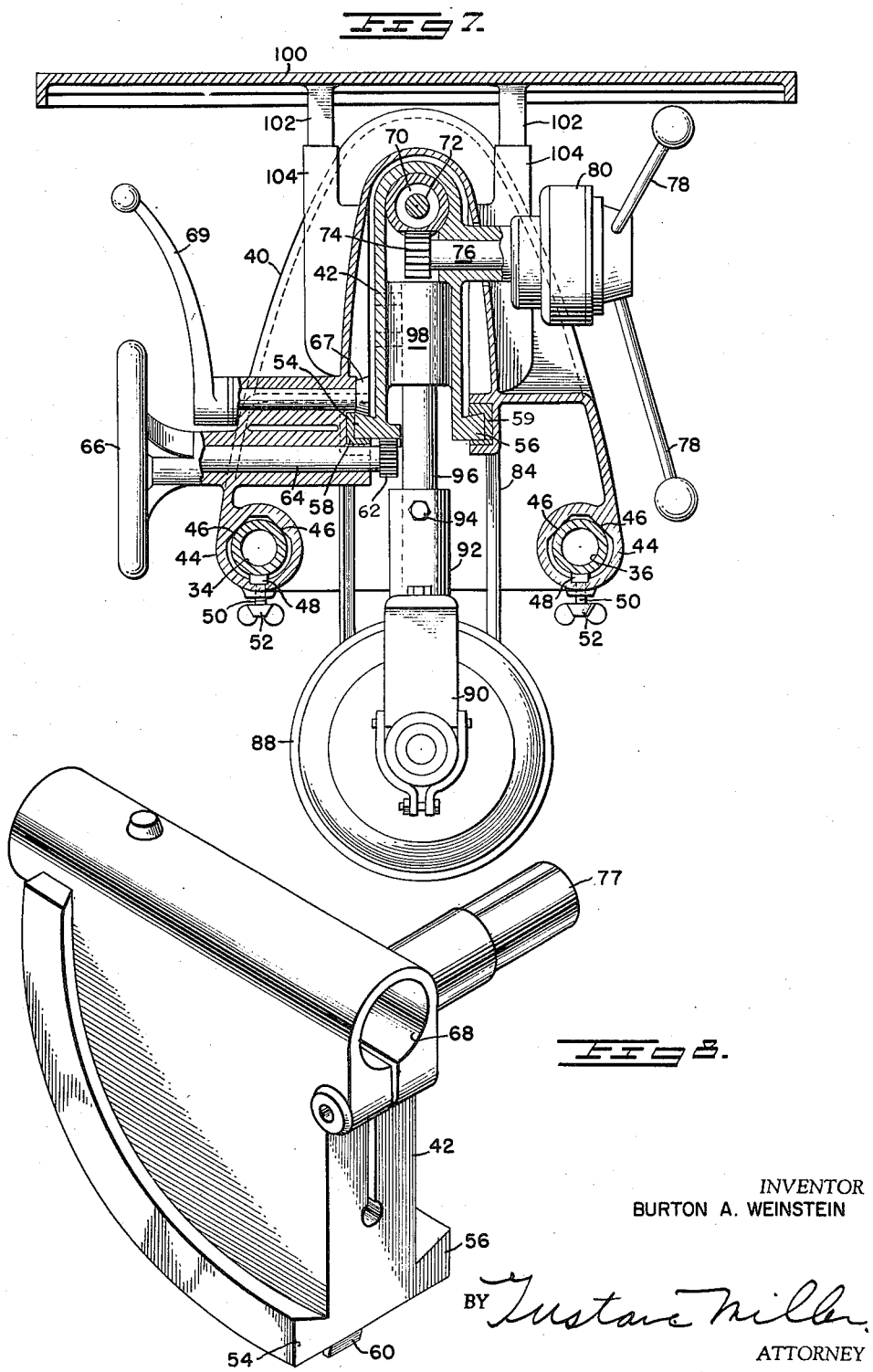

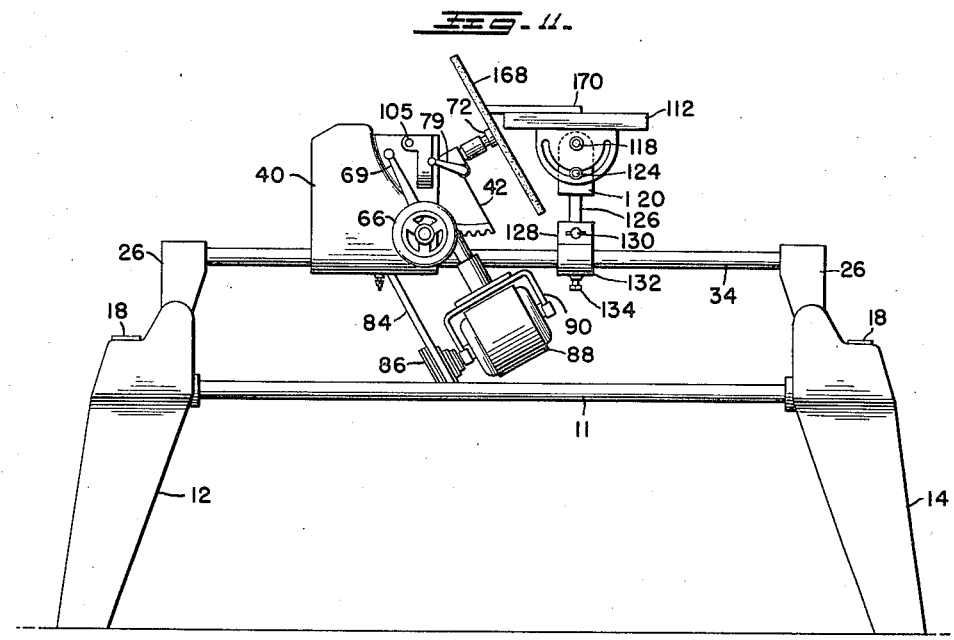
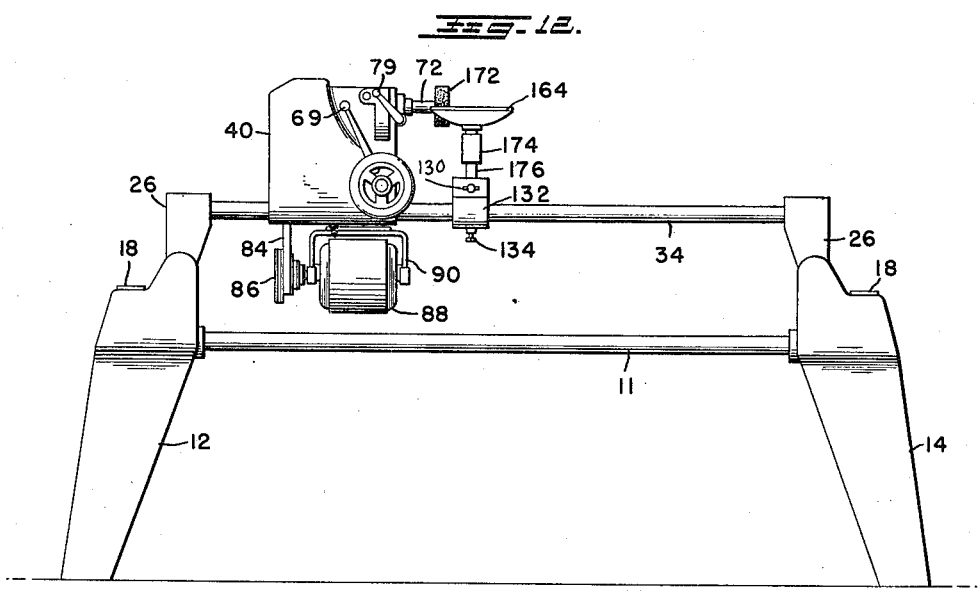

United States Patent Office 2,905,211
Patented Sept. 22, 1959

2,905,211
CONVERTIBLE MATERIAL WORKING MACHINE TOOL OF THE TILTABLE FRAME TYPE

Burton A. Weinstein, Baltimore, Md.

Application November 13, 1956, Serial No. 621,575

6 Claims. (Cl. 144—1)

This invention relates to a convertible material working machine tool, and more particularly to machine tools whose components can be variously arranged to perform diverse operations.

An object of this invention is to provide a convertible material working machine tool capable of functioning as a horizontal or vertical table, a tilt arbor power saw, a tilt horizontal drill press, a tilt vertical drill press, a tilt disc sander, a tilt grinder, a router or shaper, and the like, and in which the work can be mounted on the machine at a convenient or preferred location, depending on the type of operation to be performed.

A further object of this invention is to provide a convertible material working machine tool having a headstock arcuately adjustable in a headstock housing, with the headstock housing slidably adjustable along the ways of the machine tool, depending upon the type of operation to be performed.

Still a further object of this invention is to provide a convertible material working machine tool having a slotted saw table fixedly mountable on a headstock housing and a headstock mounted in arcuate ways in said headstock housing with the center of curvature of the arcuate ways located in a line extending along the middle of the slot of the slotted saw table and the plane of the top of the saw table.

A further object of this invention is to provide a convertible material working machine tool having ways supportable at both ends thereof on a supporting frame in horizontal position such as when the tool is used as a lathe, power saw, horizontal drill, sander, horizontal grinder, and the like, wherein the ways may be pivotally adjusted at one end to a vertical position when converting the tool for use as vertical drill press, and the like, and where the ways may be pivoted at the opposite end to a vertical position when converting the tool for use as a router or shaper.

A further object of this invention is to provide a convertible material working machine tool having tool ways which may be used in a horizontal position or may be converted to a vertical position pivotal at both ends of the ways, being automatically secured on the support at the pivoting end and automatically free for separation at the opposite end by the mere act of pivoting the ways at either end from a horizontal to a vertical position.

Still a further object of this invention is to provide a machine tool headstock arcuately adjustable in a headstock housing on the machine tool, and wherein the housing may be adjustably and slidably mounted on supporting ways, with the further feature that the ways may be adjusted from a horizontal position to a vertical position, pivoted at either end thereof.

Still a further object of this invention is to provide a machine tool having a headstock arcuately adjustable within a headstock housing, and means for supporting a slotted table on the headstock housing having a saw slot at the center of curvature of the arcuate mounting means of the headstock and headstock housing.

Still a further object of this invention is to provide a convertible material working machine tool having a universally adjustable work table mountable thereon wherein the work table service is adjustable in various longitudinal, angular and transverse positions with respect to the headstock housing and ways of the machine, enabling the table to be used for many different purposes.

Still a further object of this invention is to provide a combination material working machine tool wherein the horizontal ways may be pivoted at both ends to a vertical position about a pivot which is self-securing at the pivoting end wherein the pivot at the opposite end is automatically separable, and which, when pivoted to the vertical position, at either end is held in vertical position by the fact that the center of gravity of the ways and tool mechanism supported thereby has passed over beyond the supporting pivot and is supported on the standard or leg at that end of the supporting frame, without the need of much if any latching means for holding it in upright position.

With the foregoing and other objects in view, as will hereinafter become apparent, this invention comprises the construction, combinations, and arrangement of parts herein after disclosed, claimed and illustrated in the accompanying drawings wherein:

Fig. 1 is a side elevational view of the convertible material working machine tool of this invention illustrated as being used as a power saw.

Fig. 2 is a fragmentary view of the tool as converted for use as a vertical drill press, the ways having been pivoted on the tail stock end.

Fig. 3 is a similar fragmentary view of the tool converted for use as a router or shaper, the ways having been pivoted on the headstock end.

Fig. 4 is a fragmentary detail of the ways pivoting means, on an enlarged scale.

Fig. 5 is a transverse sectional view, on an enlarged scale, on line 5—5 of Fig. 1.

Fig. 6 is a sectional view on line 6—6 of Fig. 5.

Fig. 7 is a sectional view on line 7—7 of Fig. 1.

Fig. 8 is a perspective view of the headstock.

Fig. 9 is a side elevational view of the machine tool of this invention in use as a tilt arbor power saw and incuding a universally adjustable work piece table.

Fig. 10 is a side elevational view of the tool set up as a lathe.

Fig. 11 is a similar view of the tool set up as a tilt sander.

Fig. 12 is a similar view of the tool set up as a grinder.

There is shown at 10 a convertible material working machine tool of this invention. Machine tool 10 includes a supporting frame consisting of a pair of spaced apart horizontal bars 11 supported at each end in an outwardly flaring standard or leg 12 and 14 all made of suitable strong but preferably light weight metal.

Extending upwardly from each leg or standard 12 and 14 are a pair of spaced apart supporting plates 16 (Fig. 4) at the opposite sides of a supporting means 18. Extending inwardly from each supporting plate 16 is a circular pivot boss 20 located at the center of the curvature of and concentric with a semi-annular pivot locking track 22 which, at the end furthermost from the opposite end of the frame may be bevelled as at 24.

This pivoting boss 20 acts as a pivoting support for a leg 26 having a semi-circular foot 28 extending from the leg 26 toward the supporting plate 16 a distance at least equal to the length of the locking pivot track 22, the width of annular foot 28 being such that when it is pivoted about the supporting pivot 20, it will enter into the space between the supporting pivot 20 and the pivot locking track or annulus 22, the entry of the annular foot 28 into this space 30 being facilitated by the fact that the end 32 is bevelled similar to the bevelled end 24 of the pivoting track 22 and the bevelled ends 24 and 32 cooperate with each other as the leg 26 is pivoted about so as to rest on the supporting means 18 as shown in Figs. 2 and 3.

There are a pair of legs 26 provided at each end of the two tubular ways 34 and 36. The pair of legs 26 at each end of the ways 34 and 36 are, of course, secured together as a unit with the ends of the ways 34 and 36 in any suitable manner, as by having the legs 26 forming a part of a U-shaped member in whose bight 38 (Fig. 1) the ways 34 and 36 are firmly secured.

With the construction as thus far described, it will be apparent that the ways 34 and 36 with the legs 26 at each end form a unit that is readily separable from the framework provided by the horizontal bars 11 and the standards 12 and 14 by merely being lifted vertically therefrom, for the semi-annular foot 28 of leg 26 will readily separate in a vertical direction from the supporting pivot 20. However, if only one pair of end legs 26 is raised, the legs 26 at the other end will pivot about the supporting pivot 20 at the other end and the ways may be raised to a vertical position bringing the legs 26 to a supporting position on the supporting means 18, the center of gravity of the ways 34 and 36 with its legs and supported machinery having passed over and beyond the supporting pivot 20 so that it rests disposed in vertical position without the necessity of much of any latching means for holding it in such vertical position, as will be apparent from Figs. 2 and 3.

The ways 34 and 36 provide a slidable trackway for a headstock housing 40 within which the headstock 42 (Figs. 5 to 8) is arcuately supported. The headstock housing 40 is somewhat saddle-shaped as shown and at its bottom is provided with a pair of angular shaped shaft ways 44 for slidably resting on the horizontal ways 34 and 36. As will be observed, a V-shaped supporting surface is provided at 46 on the upper side of the shaft ways 44, and a horizontal supporting surface 48 is provided at the bottom of the shaft ways 44. Extending into this bottom surface 48 is a lock screw 50 provided with a wing handle 52 so that it may be readily tightened or loosened for permitting the headstock housing to slide along the ways 34 and 36 and be releasably locked in position as desired.

The headstock 42 is provided with a pair of arcuate feet 54 and 56 (Figs. 7 and 8) which are slidably supported in arcuate tracks 58 and 59 provided in the headstock housing 40. Beneath the arcuate foot 54 there is provided an arcuate rack 60 cooperating with a control gear 62 on the end of a control shaft 64 operable by a control handle 66 for arcuately adjusting the position of the headstock 42 relative to the headstock housing 40 as will be apparent in Figs. 7, 8 and 9. An eccentric cam 67 on the end of a shaft having a handle 69 at its other end serves to secure the headstock 42 in any desired position of arcuate adjustment relative to the headstock housing 40.

Mounted in the shaftway 68 in the top of the headstock housing 42 is the usual headstock spindle mechanism or quill 70 within which the spindle shaft 72 is rotatable, the spindle mechanism 70 being provided with its usual rack cooperating with the gear 74 on the spindle advancing shaft 76 rotatable by the conventional spnidle shaft control handles 78, the shaft 76 extending through shaftway 77 of headstock 42, and being rotated against the resistance of a retracting spring enclosed within the spring housing 80 permitting the quill 70 to be advanced, or to return automatically when the handles 78 are released as when used as a drill press in the conventional manner. A control screw 79 is provided for clamping slotted shaftway 68 to hold the quill 70 in any axially adjusted position.

The headstock spindle shaft 72 is provided with a multi-sized pulley 82 (Fig. 6) in the conventional manner having a pulley belt 84 for transmitting power thereto from a multi-sized pulley 86 mounted on a shaft of an electric motor 88 adjustably secured by a means of a U-bracket 90 on which is secured a sleeve 92 through which extends a set screw 94 for adjustably attaching it to an end of a supporting post 96, the upper end of the post 96 being secured within a sleeve 98 located between the headstock arcuate feet 54 and 56 and rigid with the headstock 42. As a result, it is obvious that the motor 88 remains in fixed position relative to the headstock 42 yet partakes of any motion thereof.

A saw table 100 provided with a pair of spaced apart depending legs 102 (Figs. 1, 5 and 7) is releasably and adjustably supported on the headstock housing 40 by having the saw table legs 102 received in bracket shafts 104 secured on opposite sides of the headstock housing 40. Clamp screws 105 (Fig. 1) may be used for securing the saw table legs 102 in any adjustable position above the lowermost position. If desired a rack will be provided on either or both table legs 102 with a pinion extending through the bracket shaft 104, similar to the rack and pinions provided for extending the quill or for adjusting the headstock in the housing, for adjusting the height of the table. The saw table 100 is provided with a saw slot 106 so located as to cooperate with a rotary saw 108 secured on the headstock spindle shaft 72 in the usual manner, the blade 108 extending through the saw slot 106 when the spindle shaft is in its normal retracted position. The curvature of the arcuate feet 54 and 56 of the headstock 42 has its center about an axis located at the intersection of the plane of the saw blade 108 and the plane of the top of the saw table 100 extending across the top of the slot 106, with the saw table 100 supported in its lowermost position. As a result, the headstock may be rotated to any desired angle, and the saw 108 will still extend through the saw slot 106 for making a cut at any desired angle as in a piece of wood 110 supported at one end on the saw table 100 and on the other end on a universally adjustable work rest 112, as shown in Fig. 9.

The universally adjustable work rest 112 consists of a flat top 114 supported on a T-stem 116 angularly pivotal by means of a pivot 118 on a supporting extension 120 being held in adjusted position thereon by means of a semi-circular slot 122 and locking screw 124. The supporting bar 120 in turn has a cylindrical supporting post 126 depending therefrom into a shaftway in a lower supporting bar 128 to which it is adjustably secured by a locking screw 130. The lower supporting bar 128 in turn is provided with a carriage 132 slidable along the ways 34 and 36 and lockable thereon by means of the lock screw 134.

The spindle mechanism or quill 70 is held in either retracted or adjusted position by means of the clamping lever or screw 79 which, of course, may be operated to released position for permitting the free operation of the control shaft 76 by means of the control handle 78.

Referring to Fig. 1, the legs 26 at the end of ways 34 and 36 opposite from the headstock housing 40 serve to support a tailstock 138 by means of a tailstock bracket 140 removably secured by screws 142 on the bight 38 connecting the tail stock legs 26.

Referring to Fig. 2, the machine tool of this invention has been converted to a drill press by removing the saw table from its saw table supporting bracket 104, by removing the saw blade 108 and by substituting a drill chuck 144 in which a drill 146 may be mounted on the headstock spindle 72. The work rest 112 is angularly adjusted to cooperate with the drill 146 and may be provided with a drill hole 150 for use when the drill operates vertically against the work rest 112 in horizontal position.

However, the work rest 112 may be adjusted by the mechanism already described to any desired angle in all three dimensions, and also, the headstock 42 may be likewise moved arcuately to change the angle of the drill 146 as shown at 147.

Instead of raising the ways about the tail stock end, the ways 34 and 36 may be pivoted about the headstock end as shown in Fig. 3, and a router or shaper blade 152 is mounted on the end of the headstock spindle 72 extending through a work table 154 mounted on supporting carriage 156 secured by lock screws 158 on the ways 34 and 36, the table 154 being provided with a router or shaper fence 160 against which a piece of wood or work will be supported while being operated on by the router or shaper 152. Obviously, the work rest table 114 may be used in place of router table 154.

It will be observed in both Figs. 2 and 3, that when used with the ways disclosed in vertical position, the center of gravity of the ways and of the machine tool parts supported thereon is over the supporting means 18 substantially beyond the pivot support 20 so that no latching mechanism is usually necessary for holding the ways in either drill press position at one end or in router position at the other end.

In Fig. 10, the machine tool of this invention is shown as assembled for use as a lathe, the work piece 162 being secured in the usual manner between the tail stock 138 and the spindle 72 of the headstock 42. A lathe chisel rest 164 is secured in the usual manner, by substituting it for the work rest 114 and supporting extension 120 on the lower supporting bar 128 on the carriage 132.

In Fig. 11, a sanding disc 168 is shown as mounted on the spindle 72 of the headstock 42, and the headstock 42 having been adjusted to an angle, the sanding disc 168 is sanding one end of a piece of work 170 at the corresponding angle. In this form, it will be noted that the tail stock has been removed as being unnecessary in this assembly, thus permitting the piece of work 170 to be of any size without interference by the tail stock 138.

In Fig. 12, a grinding wheel 172 has been mounted on the headstock spindle 72 and the tool rest 164 is utilized for supporting the tool to be ground. This tool rest 164 is adjustably secured and removably interchangeable on the supporting post 174 by having a cylindrical supporting rod 176 dependent in the cylindrical shaft way within the supporting bar 128 and on carriage 132 and adjustably held therein by means of a set screw 130.

Thus it will be seen that the convertible material working machine tool of this invention may be used in many different ways for many different purposes, and that it is readily convertible from one use to another use with a minimum of difficulty, and may be readily separated to two parts without the use of any tools to facilitate moving from one location to another. As will be apparent from the foregoing description, it may be readily used as a power saw, tiltable at any desired angle, as a drill press adjustable at any desired angle, as a router or shaper, as a disc sander tiltable to a desired angle, as a drill point grinder tiltable to a desired angle, or as a sharpening tool as well as for other uses obvious therefrom.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A convertible material working machine tool comprising a supporting frame, a pair of horizontally disposable ways, and means for removably mounting and pivotally self-interlocking said ways on said supporting frame at each end of said ways and of said supporting frame, a headstock housing mounted on said ways and slidably securable therealong, a headstock within and under said headstock housing and arcuate cooperating track ways on said headstock and on said headstock housing for adjusting said headstock in a vertical plane and in arcuate relation to said headstock housing, a transversely slotted saw table, a rotary saw blade operatively mounted on said headstock and extending through the slot in said saw table, and means for mounting said slotted saw table on said headstock housing with the transverse slot at the center of the curvature of said arcuate cooperating trackways in fixed relation thereto whereby positioning of said headstock on said trackways determines the cutting angle at which said rotary saw blade extends through said slotted saw table.

2. A convertible material working machine tool comprising a supporting frame, a pair of horizontally disposable ways, and means for removably mounting and pivotally self-interlocking said ways on said supporting frame at each end of said ways and of said supporting frame, a headstock housing mounted on said ways and slidably securable therealong, a headstock within and under said headstock housing and arcuate cooperating track ways on said headstock and on said headstock housing for adjusting said headstock in a vertical plane and in arcuate relation to said headstock housing, a transversely slotted saw table, and means for mounting said slotted saw table on said headstock housing in fixed relation thereto, a spindle on said headstock, means for securing a saw blade on said spindle in fixed relation to and partially extending through the slot in said slotted saw table, said arcuate track ways having as their center of curvature the intersection line of the plane of the saw table top and of the saw blade extending through the saw table slot in the fixed position whereby the cutting angle of said saw blade is determined by the adjusted position of said headstock on said arcuate ways.

3. A convertible material working machine tool comprising a supporting frame, a pair of horizontally disposable ways, and means for removably mounting and pivotally self-interlocking said ways on said supporting frame at each end of said ways and of said supporting frame, a headstock housing mounted on said ways and slidably securable therealong, a headstock within and under said headstock housing and arcuate cooperating track ways on said headstock and on said headstock housing for adjusting said headstock in a vertical plane and in arcuate relation to said headstock housing, a transversely slotted saw table, and means for mounting said slotted saw table on said headstock housing with its slot at the center of curvature of said arcuate ways in fixed relation thereto, said means for mounting said slotted saw table on said headstock housing providing means for adjusting the relation of said saw table to said headstock housing to adjustably determine the cutting angle of a saw blade operatively mounted on said headstock and extending through the slot in said saw table.

4. A convertible material working machine tool comprising a supporting frame, a pair of horizontally disposable ways, means for removably mounting and pivotally self-interlocking said ways on said supporting frame at each end of said ways and of said supporting frame, said mounting means being pivotally self-securable to said supporting frame at each end thereof for adjusting said ways to a vertical position at each end thereof, a headstock housing mounted on said ways and slidably securable therealong, a headstock within and under said headstock housing, arcuate cooperating trackways on said headstock and said headstock housing, a transversely slotted saw table, means for mounting said slotted saw table on said headstock housing in fixed and in adjustable relation thereto, a spindle on said headstock, means for securing a saw blade on said spindle in fixed relation to and partially extending through the slot in said slotted saw table, said arcuate trackways having as their center of curvature the intersection line of the plane of the saw table top and of the saw blade extending through the saw table slot in the fixed position, means for adjusting said headstock along said arcuate trackways to adjustably determine the cutting angle of said saw blade.

5. A convertible material working machine tool comprising a supporting frame, a pair of horizontally disposable ways, and means for removably mounting and pivotally self-interlocking said ways on said supporting frame at each end of said ways and of said supporting frame, said removable and pivotally self-interlocking means comprising a pair of pivot bosses and semi-circular pivot locking tracks concentric with said pivot bosses and spaced therebelow and a pair of cooperating semi-circular arcuate feet on each end of said ways and of said supporting frame, said feet having an annular radius about and above said pivot bosses to removably rest on said pivot bosses at both ends of said ways and of said supporting frame when said ways are in horizontal position, and to interlock with and fit between said pivot bosses and said semi-circular interlocking tracks at either end of said ways and of said supporting frame when said ways are pivoted to a vertical position relative to said supporting frame at either end thereof.

6. A convertible material working machine tool comprising a supporting frame, a pair of horizontally disposable ways, and means for removably mounting said ways on said supporting frame at each end of said ways and of said supporting frame, said removable mounting means being pivotally self-securable to said supporting frame at each end thereof for adjusting said ways to a vertical position at each end thereof, said removable mounting means comprising a pair of spaced apart upstanding plate members at each end of said supporting frame, a pivot boss projecting inwardly from each upstanding plate member toward the opposite plate member, a semi-circular pivot locking track concentric with said pivot boss and spaced therebelow, a pair of spaced apart depending feet at each end of said ways, said depending feet being spaced apart a lesser distance than said spaced apart upstanding plates so as to fit therebetween, said ways depending feet each having a semi-circular bottom surface to rest on the corresponding one of said upstanding plate member pivot bosses, an outwardly extending arcuate portion on each curved foot surface having an annular radius to fit between said pivot boss and said plate member pivot locking track, whereby when said ways are pivoted about either end from a horizontal to a vertical position, the outwardly extending semi-circular arcuate portion of each said ways feet on the pivoting end will enter between said pivot boss and said concentric locking track of the corresponding plate member at the pivoting end and the ways supporting feet at the other end will rise freely away from the plate members at such other end and the ways will thereby self-secure on the pivoting end and rest in vertically disposed position on said supporting means outwardly of said plate members on said supporting frame.

References Cited in the file of this patent
UNITED STATES PATENTS

| | | |
|---|---|---|
| 1,510,167 | Wilhelm | Sept. 30, 1924 |
| 2,013,778 | Halvorsen et al. | Sept. 10, 1935 |
| 2,200,799 | Miller | May 14, 1940 |
| 2,577,206 | Patterson | Dec. 4, 1951 |
| 2,623,269 | Goldschmidt | Dec. 30, 1952 |
| 2,661,037 | McGihon | Dec. 1, 1953 |
| 2,747,626 | Goldschmidt | May 29, 1956 |
| 2,792,858 | Bryant | May 21, 1957 |

FOREIGN PATENTS

| | | |
|---|---|---|
| 232,396 | Great Britain | Apr. 23, 1925 |